United States Patent Office 2,882,061
Patented Apr. 14, 1959

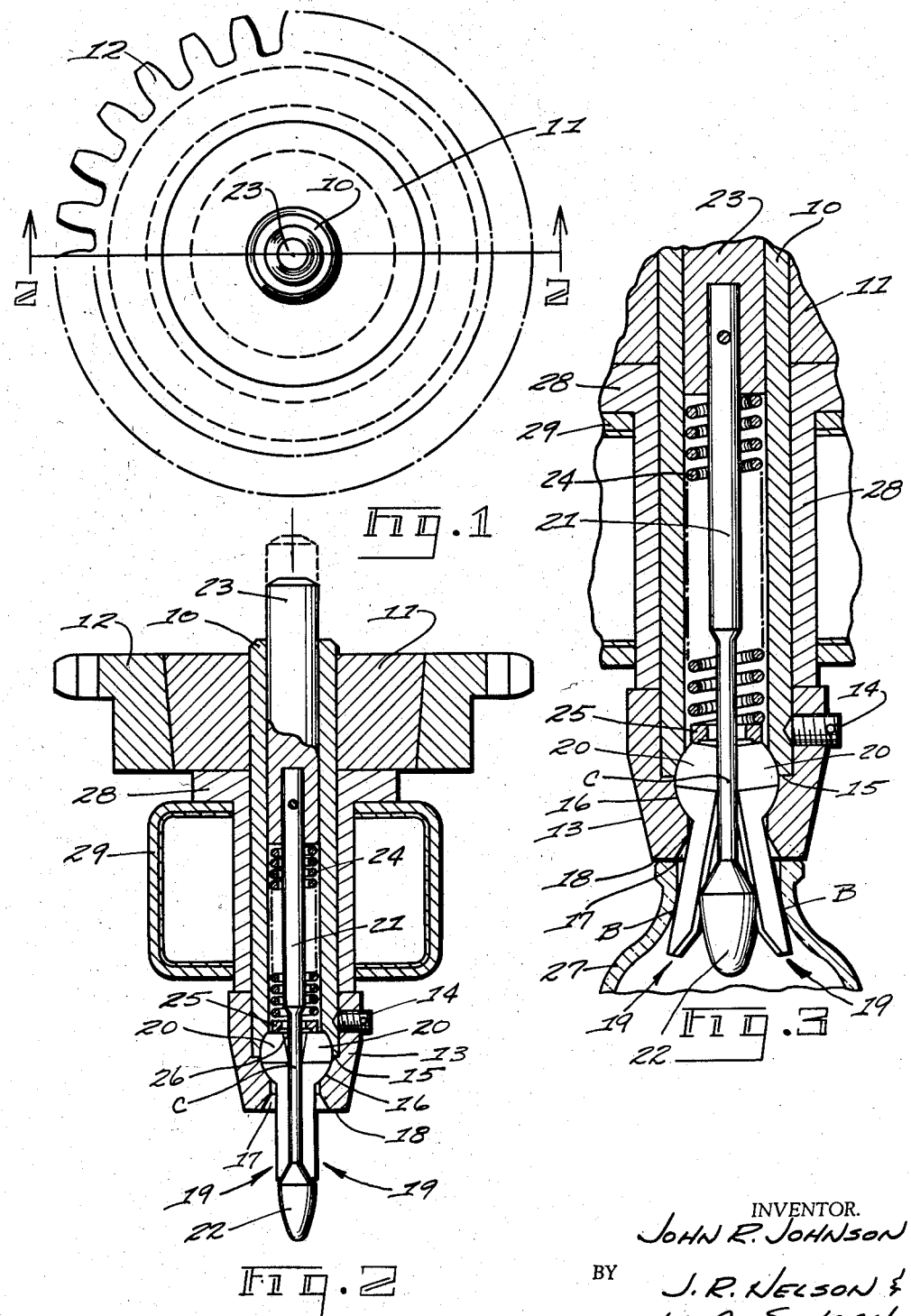

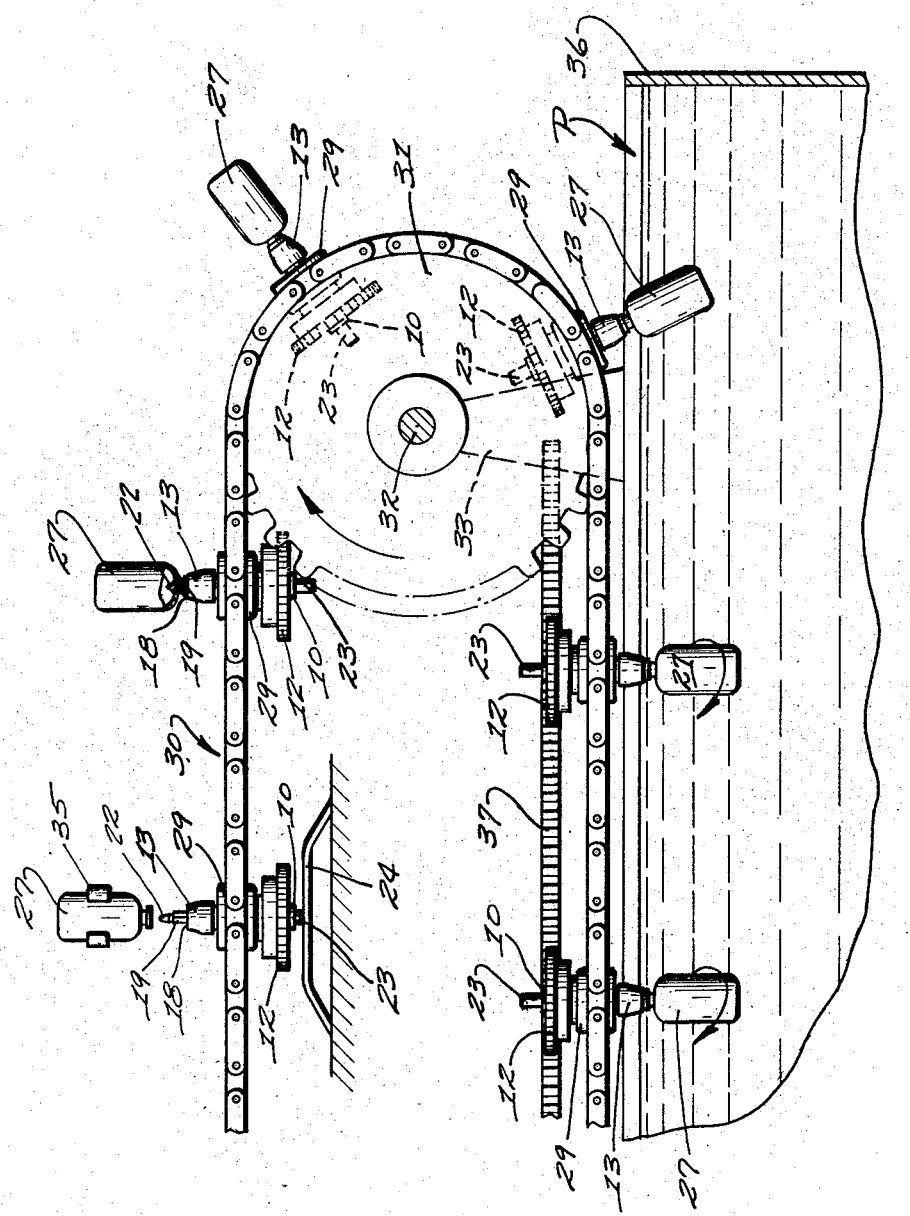

2,882,061

CHUCKING ASSEMBLY FOR SUPPORTING HOLLOW ARTICLES

John R. Johnson, Toledo, Ohio, assignor to Owens-Illinois Glass Company, a corporation of Ohio Application September 23, 1957, Serial No. 685,521

10 Claims. (Cl. 279—35)

The present invention relates to chucking devices, and more particularly to a chucking assembly for internally gripping a hollow article, such as a bottle, at its open end and retain it in aligned position for applying a coating to its exterior surface, such as by dipping, spraying, stenciling, or the like.

One example of the use of the chucking assembly, as will be hereinafter illustrated, is for chucking a glass bottle internally at its neck portion for carrying it and submersing it in a bath of liquid, such as a plastic composition for applying a surface coating of the composition to the exterior of the bottle.

An important object of the invention is to provide a chucking assembly that, when gripping a hollow article, such as a bottle, in chucking and holding it, will straighten it to align along the longitudinal axis of the chuck while holding the bottle securely from the interior and at the same time close the neck opening thereof so that during coating of the exterior of the article, the coating material will not enter its interior, even if the article is submersed in the coating material bath.

Another object of the invention is to provide a chucking assembly for holding bottles during surface treatment thereof that will grip the bottle internally at its neck portion by two or more expanding jaws, the jaws contacting the inner wall at the bottle neck and applying force thereto that is outwardly and upwardly and thereby hold the bottle by its neck and seat the surface at the neck opening securely against an annular shoulder to align the bottle and close its neck.

Another object of the invention is to provide a chucking assembly for bottles that is easily mountable on a means for conveyance and, yet the assembly is of simple construction for providing means for automatically loading and unloading bottles onto it as the assembly is carried through bottle loading and unloading stations.

A further object of the invention is to provide novel means on the chuck assembly for supplying rotation to a chucked bottle while it is undergoing surface treatment.

Other objects and advantages will become apparent from the following description, taken in conjunction with the annexed sheets of drawings on which, by way of a preferred example, is illustrated one form of the invention and a practical adaptation thereof.

On the drawings:

Fig. 1 is a plan view of the chucking assembly.

Fig. 2 is a sectional elevational view taken along line 2—2 of Fig. 1 showing the jaw of the chuck contracted in position for receiving an article.

Fig. 3 is a partial elevational view in section, showing the jaws of the chuck expanded and holding a bottle article in chucked position thereon.

Fig. 4 is an elevational view, in part schematic, showing several of the chuck assemblies mounted for travel with a conveyor chain through stations for loading and surface treating bottles.

Referring now to Figs. 1 and 2, a hollow body member 10 has a tapered pinion bushing 11 rigidly connected near its one end. The pinion bushing 11 mounts an annular pinion gear 12 integral therewith. An end extension member 13 is fitted over the other end of body member 10 and held assembled by a set screw 14. End extension member 13 is hollow and has two different interior diameters. The uppermost portion of member 13 fits snugly over the exterior of body member 10 and has an annular interior lip 15 that positions it over and adjacent the end of body member 10. The lower end portion of body member 10 is bored so that it combines with an adjacent central hollow portion of extension member 13 to provide a spherical socket joint 16 when assembled. Outwardly of socket joint 16, thus formed, is an aperture opening 17 in extension member 13 terminating in an annular laterally disposed shoulder 18. A pair of expandible jaws 19 project outwardly through aperture 17 and have end portions 20 on each jaw that are substantially semi-spherical in shape. When jaws 19 are assembled so that their spherical end portions 20 are side-by-side within socket joint 16, they form collectively a pivotal ball joint adjacent one end of the body member 10 and within the extension member 13. The central inner portion of each of the jaws 19 are grooved along their central longitudinal axis to provide a hollow passageway for receiving a slender section of round pin 21. The lower portion of the grooved inner part of jaws 19 is flared outwardly to receive the tapered surface on enlarged end portion 22 of pin 21. The other end of pin 21 is rigidly connected to a longitudinally disposed plunger 23 housed in body member 10. A coil spring 24 is compressed between the innermost end of plunger 23 and the innermost surface of the pivotal ball joint formed at end portions 20 of jaws 19. A washer 25 is interposed between the spring 24 and end portions 20. The force of spring 24 tends to shift plunger 23 and pin 21 upwardly in Figs. 2 and 3 and draw the lower enlarged end portion 22 between the jaws 19 to expand them, as indicated on Fig. 3. The pin 21 and plunger 23 reciprocate along the central longitudinal axis of jaws 19. The pivotal ball joint formed by end portions 20 of the jaws has a centrally angularly slotted portion 26 for permitting the jaws 19 to individually expand to the position shown in Fig. 3. When the jaws 19 expand, their spherical end portions 20 pivot about an imaginary center, shown as C, which is on the central longitudinal axis of the jaws.

To contract the jaws 19 to the position shown in Fig. 2, the plunger 23 is shifted downwardly in Fig. 2 by force applied at the arrow to the outer end of plunger 23 to further compress the spring 24 against the pivotal ball joint, extend the enlarged end portion 22 of the pin 21 to permit the jaws 19 to contract and pivot the spherical end portions 20 of the jaws 19 about the imaginary center C toward each other to contract the jaws in position for loading a bottle 27. A bottle 27 is loaded by inserting its neck opening over the enlarged end 22 of the pin and the contracted jaws 19, while plunger 23 is depressed and pin 21 is in its extended position, as shown on Fig. 2. The end force on plunger 23 is then released and the spring 24 shifts the plunger 23 and the pin 21 to its retracted position so that the enlarged end portion 22 is forced between the jaws 19 to expand them. As the jaws 19 are expanded, their outer surfaces engage the side of the bottle neck, as at B on bottle 27 (Fig. 3), and exert a force thereagainst that is outwardly and upwardly. This force moves the top surface of the bottle neck upwardly to seat against annular shoulder 18 on the chuck body extension 13. Since the force is applied uniformly on each jaw for expanding them, the bottle 27 is thereby axially aligned along the central longitudinal axis of the jaws and pin 21.

Referring now to Figs. 2 and 3, it is seen that the chuck assembly is provided with a bushing 28 that is fitted onto the body member 10 between the pinion bushing 11 and the body extension member 13. The bushing 28 provides an upper bearing surface between it and the lower surface of pinion bushing 11. Body member 10 is permitted to rotate within bushing 28. Outwardly at the sides of bushing 28 are side members 29 which facilitate fabrication of the chuck assembly onto links of conveyor chain 30 (Fig. 4) for mounting the chuck assembly onto a conveyor. The conveyor chain has an established path of travel in endless fashion for carrying chucked bottles on the chuck assembly through the cycle of the surface coating process.

As is seen in Fig. 4, the conveyor chain 30 is mounted to run endlessly over spaced gears, such as pinion 31. Pinion 31 is keyed to a shaft 32 that is bearing mounted on a frame 33. As shown on Fig. 4, several of the chucking assemblies are mounted at spaced distances along the links in chain 30. Over one short span of travel along the path of the chain 30 is mounted a cam surface 34 which is aligned adjacent a bottle loading station. Bottles such as 27 are held in an inverted position by any convenient means, such as tongs 35, or the bottles may be hand loaded. As a chuck assembly approaches the cam 34, its plunger 23 is aligned to ride over the cam to depress it and contract the jaws 19 of the assembly in position for receiving bottle 27 at its neck opening. When the contracted jaws 19 are in register with the opening of container 27, the container is inserted onto the chuck assembly. The container 27 is then carried loosely inverted fashion until plunger 23 rides off of cam 34, whereupon jaws 19 are expanded to seat the neck top surface of the bottle against the annular shoulder 18 of the chuck assembly. The bottle is then chucked for carriage through the surface coating process.

As the bottle 27 travels along with conveyor chain 30, it is dipped into a bath of surface coating material P contained in a tank 36. After container 27 is introduced in the bath P, pinion 12 on the traveling chuck assembly engages stationary teeth of a rack member 37, which is mounted rigidly and in operative position to mesh with pinion 12 and rotate it along a span of the path of travel of chain 30. As the conveyor chain 30 continues its course pinion 12 is driven in mesh with these teeth 37 and imparts a clockwise rotation to the central body member 10 of the chuck assembly and its chucked bottle 27.

At an advanced stage of travel of the conveyor chain, a cam similar to 34 may be located in operative alignment with the plungers of the chuck assemblies so that as a plunger 23 rides on the cam it is depressed and the end enlargement 22 of pin 21 of the chuck assembly is shifted to its extended position thereby releasing the held container 27 for unloading it.

Various modifications may be resorted to within the spirit and scope of the appended claims.

I claim:

1. A bottle chucking device for holding a hollow article gripping it internally adjacent the neck opening thereof comprising a body member, a pair of juxtapositioned expandible gripping jaws each having enlarged end portions together defining a split ball joint, a socket in the body member housing said ball, the socket permitting pivotal movement of said jaws at said ball joint about a common pivot point lying on the central longitudinal axis of said ball joint, the said jaws, when contracted, being inserted into the said neck opening of the bottle, jaw actuating means reciprocable longitudinally and centrally between the jaws between extended and retracted positions, said means, when retracted, tending to expand the jaws by pivoting them in opposite directions about said pivot point at the central longitudinal axis of a said ball joint, whereupon the bottle is gripped internally and forced upwardly by said expanding jaws, and stop means rigid on said body member disposed outwardly of said jaws to limit the upward movement of the bottle and thereby define the chucked position of the bottle.

2. The device defined in claim 1, wherein the device is adapted to hold and align a bottle having a neck and neck opening and additionally said device has an annular shoulder on the body member extending laterally outwardly of the jaws at a point intermediate their length and is perpendicular to the said central longitudinal axis, said shoulder being adapted to bear against the top surface of the neck of a chucked bottle and close its neck opening but without effecting a hermetical seal when said bottle is held by the expanded gripping jaws, and thereby axially aligning the bottle neck with the central longitudinal axis of the said expanded jaws.

3. The device defined in claim 2, wherein the jaw actuating means comprises a pin lying between the jaws and along the said central axis therebetween, one of the ends of the pin being enlarged and extending outwardly from the outer extremity of the jaws when assuming its extended position, and said enlarged end, when the pin is shifted towards its retracted position engaging the said jaws to thereby expand them by contacting each jaw laterally of the central longitudinal axis therebetween and pivoting them counter to each other, a plunger member adapted for reciprocating movement into the body member and connected to the other end of said pin opposite the enlarged end, resilient means under compression between the innermost end of the plunger and each said pivotal end portion of the jaws, said means normally tending to drive said pin towards its retracted position for expanding the jaws to hold a bottle chucked thereon.

4. The device defined in claim 1, wherein the pivotal end portions of the expandable gripping jaws are each substantially semi-spherical in shape, and pivot about said point on the central longitudinal axis of the jaws.

5. The device defined in claim 1, wherein additionally a gear is mounted on said body member for imparting rotation to a chucked bottle, a bushing journalled on said body member, said bushing including means associated therewith for supporting the said body member and providing an operative connection to a conveying means.

6. The device defined in claim 5, wherein said supporting means associated with said bushing is mounted for travel on a conveyor chain, said chain operating through bottle loading, bottle gripping, bottle dipping, and bottle revolving stations, means at said bottle loading station adapted to engage said jaw actuating means and actuating it to its extended position for contracting the bottle jaws to load a bottle, and rack gear means mounted along the bottle revolving station and engageable to mesh with the teeth of the gear member on said body member for imparting driving rotation to said body member during travel through the bottle revolving station.

7. A bottle chucking assembly comprising a body member, a plurality of outwardly projecting expandable jaws adapted to chuck a bottle when expanded by gripping it internally at its neck, an inwardly projecting end portion of each of said jaws being juxtapositioned to collectively provide a pivotal ball joint, a socket joint containing said ball joint adjacent one end of said body member, said socket joint having an aperture through which said jaws extend and providing an annular shoulder at the outermost face of said aperture, an angular slot projecting inwardly along the central axis of the pivotal ball joint for permitting limited rotation of the jaw end portions in said socket joint for expanding said jaws, means for actuating said jaws to expand and contract them by pivotal movement at said ball joint about a pivot lying on the central longitudinal axis of the jaws, said jaws, when expanded internally of a bottle being chucked, acting to force the top surface of the bottle neck upwardly to bear against said annular shoulder, whereby the bottle is held securely in axially aligned position relative to said central longitudinal axis and the bottle neck opening is closed.

8. The assembly defined in claim 7, wherein the plurality of expandable jaws comprises a pair of oppositely disposed jaws, their innermost end portions each being substantially semi-spherical in shape and being juxtapositioned to define the pivotal ball joint.

9. The bottle chucking device defined in claim 7, wherein the means for actuating the expandable jaws comprises a reciprocable plunger carried in the body member, a pin extending through the slot and central portion of the ball joint, one end of said pin being enlarged and extending outwardly from the outer extremity of the jaws whenever said jaws are contracted, and said enlarged end engaging the jaws whenever they are to be expanded thereby pivoting them outwardly about said pivot point which is located internally of the ball joint and along the central longitudinal axis of the jaws, a connection between the plunger and the other end of said pin, and resilient means under compression between the innermost end of the plunger and each of said ball joint end portions of the said jaws, said means normally tending to force the enlarged end of said pin between the jaws to expand them in engagement with the internal wall of the bottle being chucked and exert a force upwardly and outwardly against the walls of said bottle, whereby to secure it against the annular shoulder and axially align it with the central longitudinal axis of the jaws.

10. An article chucking device for holding a hollow bottle by gripping it internally adjacent the neck opening thereof comprising a body member, a plurality of gripping jaws which, through pivotal movement, are adapted to assume expanded and contracted positions, means mounting said jaws in said body member each for pivotal movement about a common axis, said axis intersecting the central longitudinal axis of said jaws, jaw actuating means engageable with said jaws and reciprocable longitudinally and centrally of the jaws between extended and retracted positions, said means when retracted tending to expand the jaws by pivotal movement about said common axis, means normally maintaining the jaw actuating means in retarded position and operable when the latter-mentioned means is moved towards its extended position for contracting the jaws, and stop means carried on said body member and disposed outwardly of said jaws, whereby the expansion of the jaws upon engagement with the interior surface of the neck of the bottle forces the bottle in an axial direction towards said body member and into engagement with said stop means, the latter limiting axial movement of the bottle in that direction to define the chucked position of the bottle.

References Cited in the file of this patent
UNITED STATES PATENTS

| | | |
|---|---|---|
| 957,201 | Gail | May 10, 1910 |
| 1,453,803 | Milliken | May 1, 1923 |
| 1,469,487 | Schedler | Oct. 2, 1923 |
| 2,494,166 | Drissner | Jan. 10, 1950 |